United States Patent [19]

Fish

[11] Patent Number: 4,569,059
[45] Date of Patent: Feb. 4, 1986

[54] OPTICALLY COUPLED DIFFERENTIAL DATA LINK

[76] Inventor: Franklin H. Fish, 9005 Carriage La., Indianapolis, Ind. 46256

[21] Appl. No.: 614,197

[22] Filed: May 25, 1984

[51] Int. Cl.⁴ .............................................. H04B 3/50
[52] U.S. Cl. ..................................... 375/36; 307/270; 330/255; 330/252
[58] Field of Search ....................... 307/262, 270, 311; 330/252, 255; 375/36; 178/63 R, 63 A, 63 B, 63 C

[56] References Cited

U.S. PATENT DOCUMENTS

| | | | |
|---|---|---|---|
| 3,744,051 | 7/1973 | Sanders et al. | 340/347 DD |
| 3,808,366 | 4/1974 | Wanamaker et al. | 375/36 |
| 3,875,332 | 4/1975 | Fletcher et al. | 375/36 |
| 4,246,582 | 1/1981 | Kondo et al. | 370/32 |
| 4,280,221 | 7/1981 | Chun et al. | 375/17 |
| 4,341,927 | 7/1982 | Shinoi et al. | 179/2 DP |
| 4,438,080 | 4/1983 | Rattlingourd | 375/17 |
| 4,490,655 | 12/1984 | Feldman | 307/262 |

OTHER PUBLICATIONS

Millman and Halkias, *Integrated Electronics*, McGraw-Hill, 1972, pp. 98–99, 690–691.

Primary Examiner—Robert L. Griffin
Assistant Examiner—Raymond C. Glenny
Attorney, Agent, or Firm—Robert F. Beers; Harvey A. David

[57] ABSTRACT

A binary digital data link includes a differential transmitter, a shielded wire pair transmission line, and a receiver having electro-optic isolation utilizes input logic transistorized switching to control current flow direction in the wire pair, the receiver being responsive thereto to provide electrically isolated binary data output.

5 Claims, 3 Drawing Figures

| FUNCTIONAL LOGIC TABLE | | | | |
|---|---|---|---|---|
| | "I" | "O" | "SPACE" | NON-ALLOWED STATE |
| LD(+) | High | Low | Low | High |
| LD(−) | Low | High | Low | High |
| L(+) | High | Low | Low | Low |
| L(−) | Low | High | Low | Low |
| $I_{L(+) \text{ To } L(-)}$ | Positive Current | Negative Current | Zero Current | Zero Current |
| $\overline{LR(+)}$ | Low | High | High | High |
| $\overline{LR(-)}$ | High | Low | High | High |

4,569,059

OPTICALLY COUPLED DIFFERENTIAL DATA LINK

BACKGROUND OF THE INVENTION

This invention relates to the field of transmission of binary encoded digital data, and more particularly to a simplex, point-to-point data link for transmitting such data in a highly reliable manner in an extremely hostile electromagnetic interference environment.

Transmission of digital data between components or electronic subsystems, e.g., avionics systems on high performance military aircraft has been subject to electromagnetic interference even when transmission is by a shielded twisted wire pair. Improvements in reliability have been achieved, notably by a closed loop binary digital communication system as described in copending patent application Ser. No. 614,196, filed May 25, 1984, and assigned to the assignee hereof, which system comprises master and slave transmit/receive units and is capable of operation in a baseband mode. The present invention is particularly well suited for, but not limited to, use as the binary digital data link portion of that system. In such use two of the simplex data links of this invention are combined to form a half duplex communication channel.

All data link design requirements can be grouped into three basic areas of consideration. First, central to every application is the data rate requirement. The upper limit defines the maximum rate of information transfer required by the equipment. Data links are normally categorized as low, medium, or high data rate channels. The circuit design approaches required to optimally implement each type are in most cases significantly different. Secondly, the quality of data transfer is specified. This normally involves some minimum bit error rate (BER) both for the clear channel and in the presence of a specified level of interference. Certain applications can tolerate a relatively large number of transmission errors, while others require virtually error free communication. The circuit design apporaches required for the two link types are different and often very specialized.

Finally, the physical environment the data link must operate in and conform to is specified. For the case of aircraft applications such factors as cable type, cable length, number of interconnects, connector types, shielding and grounding configurations, available power, and maximum transmitter/receiver size and weight are usually determined prior to the data link design. In addition, environmental requirements such as operating temperature range and EMI limits are specified. All of these factors must also be considered in data link design.

SUMMARY OF THE INVENTION

With the foregoing in mind, it is a principal object of this invention to provide an improved binary digital data link for point-to-point communication of such data while meeting a range of design requirements, whereby the principles and apparatus embodying the invention are capable of replacing a variety of prior approaches.

Another and important object of the invention is the provision of a binary data link that is uniquely reliable in the presence of a severe electromagnetic environment such as on high performance military aircraft.

Still another object is to provide a novel transmitter/receiver combination that is operable in the low and medium data rate ranges, i.e., from dc to approximately 1 megabit per second, and is substantially error free in operation at a low data rate of approximately ten kilobits per second.

As yet another object, the invention aims to accomplish the foregoing through novel circuit arrangements, combination of elements, and cooperative relationships thereof which provide a high level of performance.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
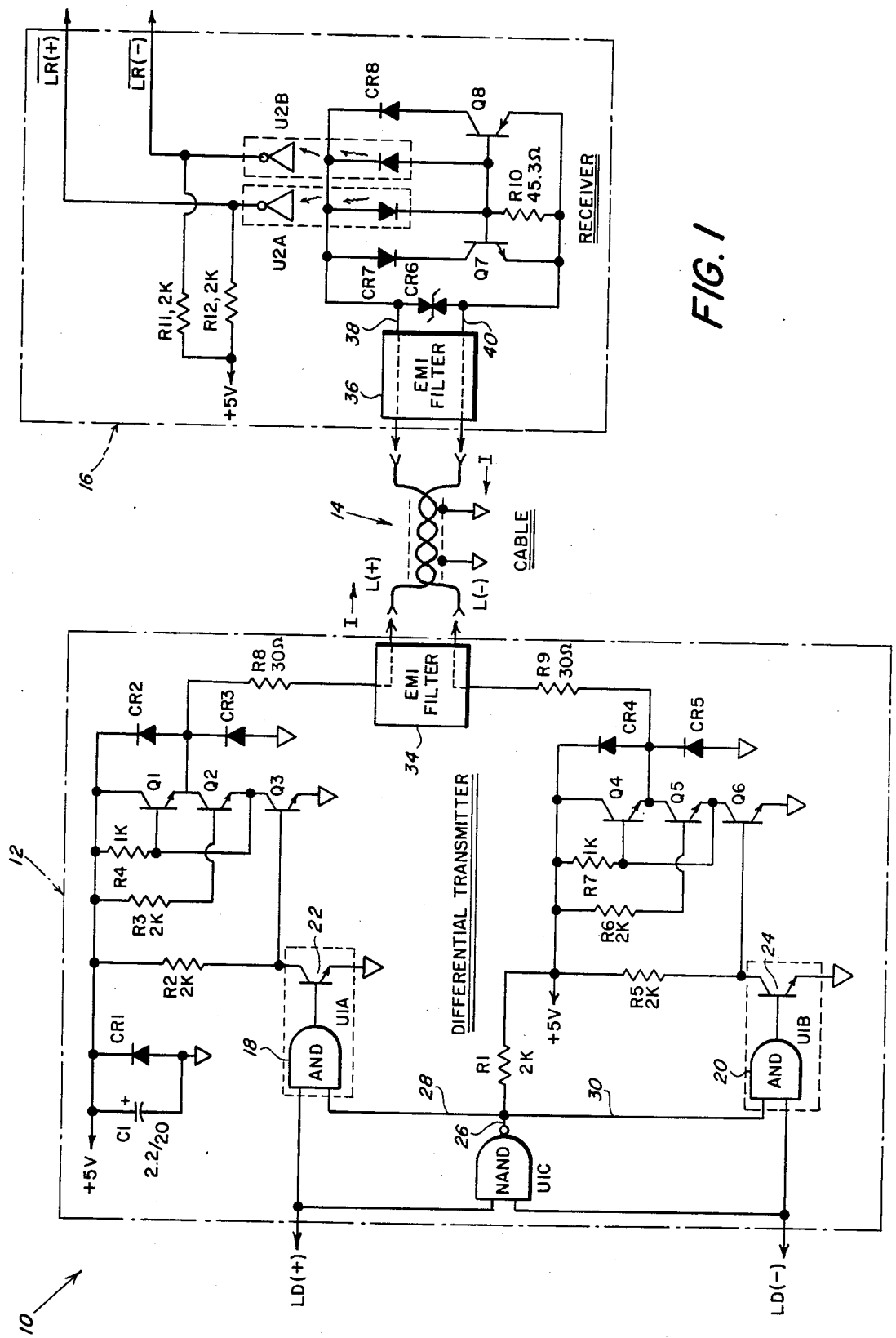
FIG. 1 is a schematic illustration of a data link embodying the invention.

In the exemplary form of the invention illustrated in FIG. 1 and described hereafter, an optically coupled differential data link embodying the invention is indicated generally at 10 and comprises a differential transmitter 12, a shielded, twisted-pair transmission line 14, and an optically coupled differential receiver 16. The transmitter 12 comprises two input gates U1A and U1B comprising "TTL" (transistor transistor logic) AND gates 18, 20 coupled to the bases of NPN transistors 22, 24, respectively. Binary input data is presented to the transmitter 12 via lines LD (+) and LD (−). The former is connected as shown as a first input to each of AND gate 18 and a NAND gate U1C, while the latter is connected as shown as a first input to an AND gate 20 and as a second input to the NAND gate U1C. The output of NAND gate U1C, line 26, is connected through a pull-up resistor R1 to a +5 V source so as to provide a second input via lines 28, 30 to each of the gates 18 and 20.

Transistor 22 of gate U1A has its emitter connected to nominal ground and its collector connected directly to the base of a transistor Q3 and through a resistor R2 to the +5 v source. Transistor Q3 is connected as shown with transistors Q1 and Q2, and resistors R3, R4 and R8, the latter resistor being connected through an EMI filter 34 to one wire L (+) of the transmission pair 14. Similarly, transistor 24 of gate U1B has its emitter connected to ground and its collector connected directly to the base of a transistor Q6 and through a resistor R5 to the +5 v source. Transistor Q6 is connected as shown with transistors Q4 and Q5, and resistors R6, R7, and R9, the latter resistor being connected through filter 34 to the other wire L (−) of pair 14. These transistor-resistor networks operate in a manner presently described as differential current flow sources for existence and direction of current flow over lines L (+) and L (−) and through the differential receiver 16.

The receiver 16 comprises an EMI filter 36 connected to pass the data signal representing current flow conditions of transmission lines L (+) and L (−) via lines 38 and 40 to a diode/transistor network including the input sides of first and second, oppositely oriented, opto-electronic couplers U2A and U2B, a resistor R10, and transistors Q7 and Q8. The outputs of the couplers U2A and U2B, lines $\overline{LR\,(+)}$ and $\overline{LR\,(-)}$, are connected by pull-up resistors R12 and R11, respectively to a +5 v source so as to provide the desired logical high, or low conditions as outputs of the receiver 16, all as will be more fully described as this specification procedes.

MODE OF OPERATION

Figures 2, 3:
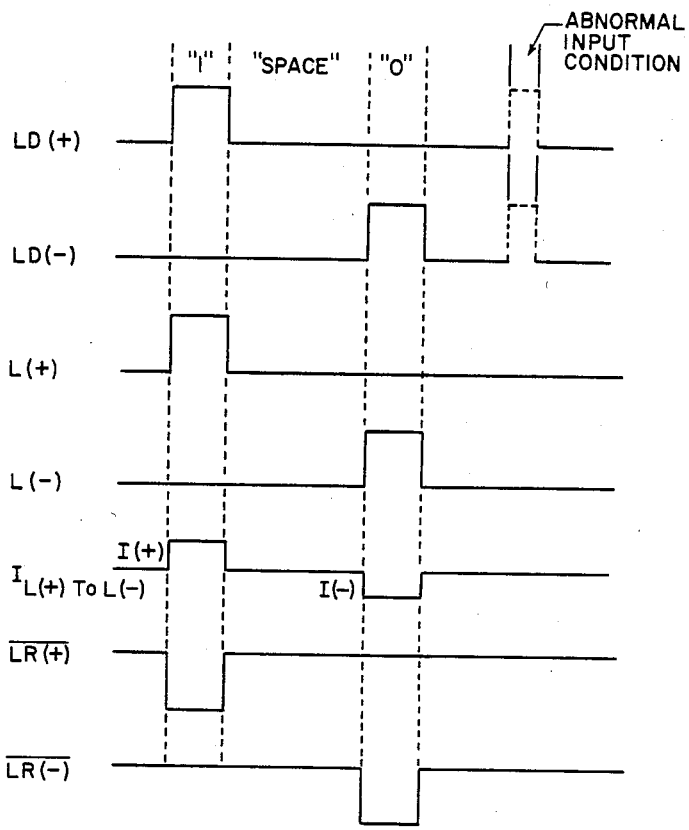
FIG. 2 is a graphic illustration of waveforms of the data link of FIG. 1.
FIG. 3 is a tabular presentation that summarizes the logic function operations of the data link.

The manner in which the pairs of signal lines are utilized is a significant feature of this design. Referring to FIG. 2, a data bit high or "1" state is defined as a TTL high level at the LD (+) input terminal with a simultaneous TTL low static input at the LD (−) input terminal. Correspondingly, a data bit low or "0" is defined as a TTL low on the LD (+) line in conjunction with a TTL high level on the LD (−) line. Simultaneously driving both LD (+) and LD (−) to a TTL logic low level results in a "space" condition. The "space" condition is the normal state the data link assumes between bit transmissions. The concurrent application of a TTL high to both the LD (+) and LD (−) lines is a non-allowed input condition. The transmitter has circuitry provisions which allow it to ignore this input condition should it accidentally occur due to some malfunction in the transmit system.

Referenced to the transmission lines, a logic "1" corresponds to current flow on the data lines in the direction shown on FIG. 1. A logic "0" causes current to flow in the opposite direction around the loop. A "space" condition results in no current flow on the lines. The output signals $\overline{LR\,(+)}$ and $\overline{LR\,(-)}$ correspond directly to the input signals except for being their logic complements.

The table of FIG. 3 summarizes the operation of the data link viewed from the logic function aspect. It is noted that both $\overline{LR\,(+)}$ and $\overline{LR\,(-)}$ are never simultaneously at a logic low during normal operation of the data link. The link is configured so that the effect of a larger interfering common mode signal is to cause both $\overline{LR\,(+)}$ and $\overline{LR\,(-)}$ to go simultaneously low. The failure state caused by interference does not, therefore, correspond to any of the differential mode transmission states. The receive logic can make use of this fact to separate the valid data from external interference.

The detail operation of the data link circuit will now be continued with reference back to FIG. 1. The purpose of gate U1C is to detect the condition where both LD (+) and LD (−) are simultaneously high. As previously explained, this state corresponds to an input fault condition. Under this fault condition the output of gate U1C goes low thereby disabling the input circuits of gates U1A and U1B. Both open-collector output transistors 22 and 24 are turned "off" which causes the transmitter circuit output stages to go low, and thereby connect each of the lines to ground. Under normal input drive conditions the output stage of gate U1C is turned "off," allowing pull-up resistor R1 to enable both the LD (+) and LD (−) input circuits.

The transmission of a logic "1" requires LD (+) to be high, thereby turning "on" the open collector output transistor 22 of gate U1A. The base of transistor Q3 is consequently switched to ground potential causing this device to turn "off." When transistor Q3 turns "off" the emitter circuit of transistor Q2 is opened causing Q2 to also turn "off." Transistor Q1 is now able to conduct with base current supplied via resistor R4. In this configuration transistor Q1 does not saturate but acts as an emitter follower. For this reason a high Beta, linear transistor type is utilized for Q1. An advantage of this output stage configuration is that it is impossible for all three transistors to conduct simultaneously. As a result, current spiking and the EMI it generates is totally eliminated.

With transistor Q1 conducting, current flows from the +5 VDC power supply, through Q1 and resistor R8, and onto the L (+) line. At the receiver this current divides between diode CR7 and the LED (light emitting diode) which is part of optocoupler U2A. Transistor Q7, resistor R10, diode CR7, and the LED comprise an active current regulator termination. The purpose of this circuit is to regulate the LED current within the range specified for proper operation of the optocoupler. It is shown later that while the drive current on the line varies over a considerable range, the current through the LED is always held within its specified operating range.

The current flowing out of the regulator circuit enters the L (−) line by which it is returned to the transmitter section. Since LD (−) is low the open collector output transistor 24 of gate U1B is "off." Transistor Q6 is, therefore, turned "on" with base current supplied via resistor R5. Transistor Q5 is also "on" with its base current drive supplied by resistor R6. Transistor Q4 is "off" since its base-emitter junction is reverse biased by the collector-emitter saturation voltage of transistor Q5. The return current, therefore, flows through resistor R9 and then through the saturated series switching transistors Q5 and Q6 to ground. A gold-doped transistor type optimized for saturated switching applications is chosen for Q5, Q6, and also for the corresponding devices Q2 and Q3.

At the receiver, the Q8 regulator circuit is "off" during this interval with no current flow in either CR8 or U2B. Optocoupler U2B is "off" and its open collector output is pulled high by resistor R11. Optocoupler U2A is turned "on" by the positive current flow through the transistor Q7 regulator circuit, and the output signal levels are as shown in FIG. 2.

The procedure for transmission of a logic "0" is identical to the above described operation, except that the input drive conditions at the transmitter circuits are reversed. For the case of a logic "0" LD (−) is high thereby causing transistor Q4 to be "on." Current flows from the +5 V supply through Q4 and resistor R9 onto the L (−) line. At the receiver, the negative regulator circuit comprised of transistor Q8, resistor R10, diode CR8, and optocoupler U2B is activated. The output of U2B is driven to a logic "low" state while the output of U2A remains in the logic "high" state. Current flows out of the negative regulator circuit and is returned to the transmitter via the L (+) line. Since LD (+) is "low," the open collector output transistor 22 of U1A is "off" causing both transistors Q2 and Q3 to be "on." The return current flows through resistor R8 and the two saturated series transistors to ground.

During the "space" interval both LD (+) and LD (−) are low. This causes transistors Q2, Q3, Q5, and Q6 to be turned "on" simultaneously. Both the L (+) and L (−) lines are effectively tied to ground potential and consequently no current flows in the receive loop. Optocouplers U2A and U2B are "off" and both $\overline{LR\,(+)}$ and $\overline{LR\,(-)}$ are high.

Diodes CR1, CR2, CR3, CR4, CR5, and CR6 operate in conjunction with resistors R8 and R9 to provide protection from accidental short and from high levels of induced interference. Diode CR1 is a transient protection device which prevents excessive voltage levels from being impressed on the +5 V power line. This clamping action serves to protect the power supply and the electronic circuitry it powers. In addition diode CR1 provides a low impedance clamping point for control of transmission line transients. The transmission lines are clamped to this point via diodes CR2 and CR4. These diodes will conduct only when the transmission line voltage exceeds the overvoltage protection level determined by CR1. Similarly, diodes CR3 and CR5 clamp the negative transmission line transients to the ground bus. These devices operate in conjunction with resistors R8 and R9 which serve to limit the fault current. If the fault condition is not severe then the circuit will not be damaged and normal operation will resume, once the fault is removed. In the event of a catastrophic fault, such as shorting of a data line to the aircraft 115 VAC power bus, resistors R8 and R9 will fail open. These resistors are conveniently fusible wirewound devices which are designed for failsafe, flameless operation.

Resistors R8 and R9 set the value of the loop current during normal operation and else serve to back match the transmission lines. Diode CR6 is a bidirectional transient protection device which protects the receiver circuit from differential mode transients.

Diodes CR7 and CR8 prevent forward current flow in the base-collector junctions of transistors Q7 and Q8, respectively. In the absence of these diodes a reverse current path would exist through resistor R10 and the base-collector junction. This would effectively short out the conducting LED since the LED junction threshold voltage is much higher than the base collector forward voltage. In order to maintain symmetry of operation, complementary NPN-PNP transistor types which exhibit matched characteristics are desired for Q7 and Q8. The purpose of the EM1 filters 34, 36 is to reject interference contained in the bandwidth region above which the data link operates. The filters also prevent internally generated EM1 from being conducted onto the data lines.

From the foregoing detailed description it will be recognized that the previously stated object and advantages, as well as others, are achieved by the unique circuit configuration of the data link of this invention, notably the logic controlled differential transmitter coupled with the selective current regulation termination of the optically coupled receiver.

What is claimed is:

1. A binary digital data link apparatus comprising:
   first and second conductive transmission lines each having a transmitter end and a receiver end;
   differential transmitter means connected to said transmission lines and having first and second data input connections, said transmitter means being responsive to predetermined combinations of first and second input logic levels at each of said first and second data input connections to provide predetermined electrical conditions at the transmitter ends of said transmission lines;
   said transmitter means comprising a first solid state switching network connected between a voltage source and said first transmission line, a second solid state switching network connected between a voltage source and said second transmission line, input logic means responsive to said predetermined combinations of input logic levels for controlling said first and second networks so as to provide electrical current flow to and from said receiver means in a first directional sense corresponding to a first of said predetermined combinations and in a second directional sense corresponding to a second of said predetermined combinations;
   said receiver means comprising first and second oppositely oriented current regulator means, responsive to electrical conditions on said transmission lines for directing said current through first or second receiver paths, and first and second current to voltage level means responsive to said current in said first and second paths, respectively, for providing said output logic levels; and
   said logic means comprising first, second, and third coincidence gates, said first gate being responsive to coincidence of a first of said input logic levels and a predetermined output of said third gate, said second gate being responsive to coincidence of a second of said input logic levels and a predetermined output of said third gate, and said third gate being responsive to coincidences of predetermined ones of said input logic levels at said first and second data input connections.

2. A binary digital data line apparatus a defined in claim 1, and wherein:
   said first and second coincidence gates comprise AND gates, and said third coincidence gate comprises a NAND gate.

3. A binary digital data link apparatus as defined in claim 1, and wherein said first and second current to voltage level means comprise:
   first and second electro-optic isolator devices each having an electrical output; and
   first and second pull-up resistors connected between a source of voltage and the output of said first and second isolator devices respectively.

4. A binary digital data link as defined in claim 3, and wherein:
   said first and second transmission lines comprise a shielded pair, with shielding grounded to said nominal ground.

5. A binary digital data link as defined in claim 4, and wherein:
   said transmitter means and said receiver means each comprise an electromagnetic interference filter connected to the respective ends of said transmission lines.

* * * * *